UNITED STATES PATENT OFFICE 2,240,212

PITUITARY PRODUCT AND PROCESS OF PREPARING THE SAME

Edgar A. Ferguson, Jr., Brooklyn, N. Y.

No Drawing. Application February 28, 1939,
Serial No. 259,060

3 Claims. (Cl. 167—74)

This invention relates to physiologically active principles obtained from the pituitary body and processes of preparing the same, and it comprises, as new materials, physiologically active substances obtained either from the separated anterior, or separated posterior substance of the pituitary body after removal of water-soluble physiologically active substances therefrom. It further comprises processes wherein the separated anterior and separated posterior substance (lobe) of the pituitary body or gland is extracted with aqueous agents to remove water-soluble physiologically active substances, and the residue from such extraction treated with acid-alcohol extraction liquids to extract new physiologically active principles.

The functions of the pituitary gland have been investigated in great detail by many workers in the medical sciences. It is, for example, well known that the anterior substance, or lobe, of the pituitary gland contains a growth hormone or factor, and that the posterior substance, or lobe, of the pituitary gland contains the so-called "smooth muscle" factor, namely a factor which causes the contraction of the smooth muscles in the body.

Extracts of water-soluble substances of each lobe, and of the pituitary gland as a whole, have been commercialy prepared and are used for injection purposes when pituitary hormone deficiency requires correction.

For example, there are extracts of the posterior lobe of the pituitary gland on the market and the U. S. Pharmacopeia defines the posterior pituitary liquid or extract, known as pituitrin, as "the water-soluble principle or principles from the fresh posterior lobe of the pituitary body of healthy domesticated animals used for food by man."

Pituitrin is customarily prepared by extracting the defatted and dehydrated pituitary lobe with 0.25% acetic acid solution. The extract can then be used for injection. In performing this process the posterior lobe is simply extracted in the usual way with the extraction liquid and the residue discarded.

Similarly the anterior lobe has been extracted with dilute acetic acid. Such extracts contain water-soluble growth factors in the anterior lobe, but here again, the solid residue remaining after the extraction has been discarded.

I have now discovered that the solid residue remaining after the extraction of either the anterior, or the posterior lobes of the pituitary gland contains valuable physiological materials which can be extracted therefrom with acid-alcohol extraction liquids. So far as I am aware I am the first to have extracted these residues, and to have discovered the physiological activity of such extracts.

For example, from the residue remaining after the extraction of the posterior lobe with dilute acetic acid I am able to obtain an acid-alcohol extract containing factors which decrease the pulse rate, blood pressure, metabolism, and water balance, and additionally induce sleep. This sleep factor is especially desirable since injections of my product have the property of generally relaxing the patient and inducing the tendency to normal sleep without any of those characteristics common to hypnotics. At the same time, the posterior lobe extract of the present invention is free of those substances which cause smooth muscle contraction, intestinal peristalsis and contraction, and increase in blood pressure.

From the anterior lobe, after removal of water-soluble growth, sex and thyrotropic factors, I am able to obtain an acid-alcohol extract containing substances which stimulate basal metabolism, water balance, and other factors which I shall presently describe.

Thus, in broad aspects, the products of my invention can be defined as extracts of the acid-alcohol soluble principle of a separated lobe of the pituitary gland from which water-soluble principles have been previously removed. And in broad aspects, my process can be characterized as the extraction of a separated lobe of the pituitary gland which has been freed of water-soluble principles, the extraction agent being a mixture of acid and alcohol, as I shall more fully describe.

The processes of the present invention are thus applicable to the processing of both the separated anterior and the separated posterior lobes of the pituitary gland.

In either instance, the first step in my process is the removal from such lobes of water-soluble physiologically active principles. The prior art has already described the usual way of extracting such lobes with dilute acetic acid. In general this method simply consists in starting with a defatted and dehydrated lobe in powdered form, and subjecting the powder to extraction with 0.25% acetic acid. After such extraction is finished, I then, in accordance with the present invention, extract the solid residue with a solution composed of ethyl alcohol containing a very small amount of sulfuric or other acid having no destructive action on the physiologically active principles I extract from the residue. Hydrochloric or other commonly used acid may be used but sulfuric is preferred.

Instead of performing the first extraction of either the posterior or anterior lobe with dilute acetic acid I can extract with a dilute solution of caustic soda since this agent also removes water-soluble physiologically active principles.

I shall now describe my invention in greater detail, with reference first to the treatment of the posterior lobes, it being understood, however, that the following examples are merely illustrative and are not intended to limit the appended claims in any way.

Instead of extracting the posterior lobe in the classical way with 0.25% acetic acid solution, I can first prepare an extraction liquid containing about 180 parts of water, 0.32 part of sodium hydroxide, and about 0.8 part by weight of tricresol. For each 180 parts by weight of such solution I take 30 parts by weight of the defatted and dehydrated posterior lobe and allow the extraction liquid to act on the lobe for about one hour. The entire mixture can then be neutralized with a dilute solution of sulfuric acid or other suitable acid and filtered. The filtrate contains the basic smooth muscle principle and acts very much the same as surgical or obstetrical pituitrin except that its haemostatic action derived through the contraction of the smooth muscle of the blood vessels in greater than that of pituitrin when used subcutaneously or topically. Before filtering it is advantageous to add about 200 parts by weight of normal saline solution.

This filtrate, as stated, is substantially the same as the ordinary pituitrin extracts hitherto prepared by using dilute acetic acid as regards the smooth muscle principle. The filtrate, or extract, contains those hormones which cause uterine contraction, intestinal contraction, increase in blood pressure and similar smooth muscle effects, and especially the haemostatic action.

I then treat the remaining solid residue of the posterior lobe with an acid-alcohol solution for the preparation of certain of the products of the present invention. To each 30 parts by weight of the original defatted and dehydrated posterior lobe submitted to the extraction just described above, I add to the residue from such extraction an extraction liquid composed of 180 parts by weight of 95% ethyl alcohol and about 0.2 part by weight of 36 normal sulfuric acid solution. After stirring I let the mixture stand overnight and then filter. Alcohol is removed from the filtrate by boiling at about 25° C. under 29 mm. of mercury and the remaining solution, which can be rendered isotonic in the usual way, is used for injection. The filtrate can be evaporated to dryness to get crystals if desired, and these crystals can be taken up in a suitable vehicle for injection purposes. The vehicle which may be normal saline (NaCl) or the accompanying salts ($Na_2SO_4$) or it may be rendered isotonic with glycerine and chlorobutinal or cresol or phenol or mixtures of these compounds used in a manner well known to the art. The residue from this extraction with acid-alcohol can be dried and used for oral administration and it gives many of the reactions of the acid-alcohol filtrate.

The acid-alcohol filtrate from the posterior lobe after freeing the latter from water-soluble principles contains a substance having the following physiological activity. It induces sleep, decreases the pulse rate, decreases the blood pressure, basal metabolism and water intake. It has absolutely no action on the uterus. Tests have proven that my acid-alcohol extract contains none of the active principles found in the ordinary classical aqueous extracts of the posterior lobe. In consequence, I have thus been able to prepare from the posterior lobe extracts of physiological principles which have hitherto gone unrecognized in the art.

Alternatively, I can start with the ordinary residue resulting from the extraction of the fresh lobe with dilute acetic acid. This residue, as stated, is constantly discarded in prior processes.

In the same manner I can process the anterior lobe of the pituitary gland. Here again I first extract water-soluble principles either by using dilute acetic acid, or by dilute alkaline solutions, in the latter case obtaining the standard alkaline extract of Evans. In this first extraction step, 30 parts by weight of the defatted and dehydrated anterior pituitary substances from hogs, beef and sheep is extracted with about 150 parts by weight of water containing about 7.5 parts by weight of tenth normal sodium hydroxide and 0.7 part by weight of tricresol. The mixture, after standing for about an hour, is then neutralized with about 7.5 parts by weight of tenth normal sulfuric acid and allowed to settle. The supernatant liquid can be filtered or centrifuged.

This standard procedure may be modified by the use of ammonium hydroxide or other alkalis as is well known in the art.

The aqueous extract or filtrate thus obtained is the standard, commercial extract of the anterior substance and contains the growth, sex and thyrotropic factors.

To the residue left from the extraction, which residue may contain as much as 30 parts by weight of residual water, I add an extraction liquid containing about 150 parts by weight of ethyl alcohol, 7.5 parts by weight of $\frac{1}{10}$ normal sulfuric acid, and 0.75 part by weight of tricresol. This mixture is allowed to stand from one to five days at room temperature or below, generally about 0° C. to 10° C. and thereafter the mixture is filtered or centrifuged. The extract thus obtained has a pH of about 2.8 to 4.5 and it contains those physiologically active principles remaining in the anterior substance after removal of water-soluble principles. This extract is then boiled at about 35° C. under a vacuum of 25 mm. of mercury pressure until all alcohol is removed. The remaining fluid is then centrifuged, advantageously at low temperature, about 5° C., and the clarified extract adjusted for isotonicity. This extract can then be sterilized and used for injection. The extract can be dried to give crystals which can be redissolved in suitable vehicles to give solutions for injections.

This extract, which forms another of the products of the present invention is almost entirely free of the growth, sex and thyrotropic factors of the anterior lobe. Physiologically it acts as follows. When given to rats of from four to six months of age and daily injections of about 1 cc per kilo it causes an increase of about 15% weight of the submaxillary gland, an increase in blood supply to the endocrine glands, and the production of active cell proliferation, especially in the submaxillary glands.

When this extract is administered in a typical case of myxedema in doses of 1 cc. per day but varying with the condition of the patient, it functions as follows. It causes a decrease in edema, a decrease in salivation, the relief of nausea, and a stimulation of the psychic and physical activity.

When given to a case of typical hyperinsulinism in doses of 1 cc. per day and varying with the condition of the patient, the effects are as follows. It controls low blood sugar by the production of a rise of about 20% to 40% in blood sugar value, an improvement in the mental state of the patient, a decreased desire for sugar or food, and a reversal of typical insulin symptoms.

When injected into rats over a period of time, it shows evidence of insulin desensitizing effect. For instance, when injected daily for two days in dosages of 4 cc. per kilo of rabbit weight, one and two hours before administration of one rabbit unit of insulin, its effects are as follows. It delays the onset of clinical symptoms of insulin shock, and it decreases the blood sugar drop from about 10% to 20%.

The posterior substance extracts of the present invention are especially suitable when it is desired to induce a general relaxation in the patient, and to aid in inducing sleep. These extracts which are administered in dosages of about 1 cc. have a quieting influence within one-half hour without causing any of the physiological effects associated with the ordinary water-soluble extracts of the posterior substance. The posterior extracts of the present invention offer a convenient means of decreasing blood pressure and pulse rate.

The anterior extracts of the present invention are especially useful in controlling hyperinsulinism edema in the clinical syndrome of myxedema, and mental myxedema (i. e. mental retardation associated with low basal metabolic rate).

Having thus described my invention, what I claim is:

1. The process of preparing a therapeutic agent which comprises extracting a posterior lobe of the pituitary gland with an aqueous extraction solution to remove physiologically active components, stimulating the uterine muscles and increasing the blood pressure and soluble in dilute acid and dilute aqueous alkaline solutions, and then extracting the residue with an acid-alcohol extraction liquid to obtain an acid-alcohol liquid extract of different physiologically active substances substantially insoluble in the aqueous extraction liquid.

2. A process of preparing a therapeutic agent which comprises extracting with an acid-alcohol extraction agent the separated posterior lobe of the pituitary gland from which physiologically active components soluble in aqueous alkaline solutions have been removed, to obtain an acid-alcohol extract containing physiologically active substances insoluble in aqueous alkaline solution.

3. A therapeutic agent comprising an acid-alcohol soluble, substantially insoluble in dilute aqueous acids and alkalis, relatively non-toxic physiologically active substance derived from the posterior lobe of the pituitary gland and having the properties of inducing sleep, of decreasing blood pressure and of decreasing basal metabolism rate.

EDGAR A. FERGUSON, Jr.